Aug. 30, 1949.   E. G. PANKOW   2,480,302

CONTROL FOR ELETRICALLY HEATED WATER TANKS

Filed Jan. 6, 1948

INVENTOR
EDMUND G. PANKOW
ATTORNEY

Patented Aug. 30, 1949

2,480,302

UNITED STATES PATENT OFFICE 2,480,302

CONTROL FOR ELECTRICALLY HEATED WATER TANKS

Edmund G. Pankow, Mansfield, Ohio, assignor to Westinghouse Electric Corporation, East Pittsburgh, Pa., a corporation of Pennsylvania Application January 6, 1948, Serial No. 708

3 Claims. (Cl. 219—39)

My invention relates to a control for an electrically-heated water storage tank and has for an object to provide an improved control of this kind.

A further object of the invention is to provide an improved control of the type set forth which normally maintains the water in the tank at a predetermined temperature and which may be readily adjusted at will to provide a single charge of heated water at a temperature higher than normally provided.

Figure 1:
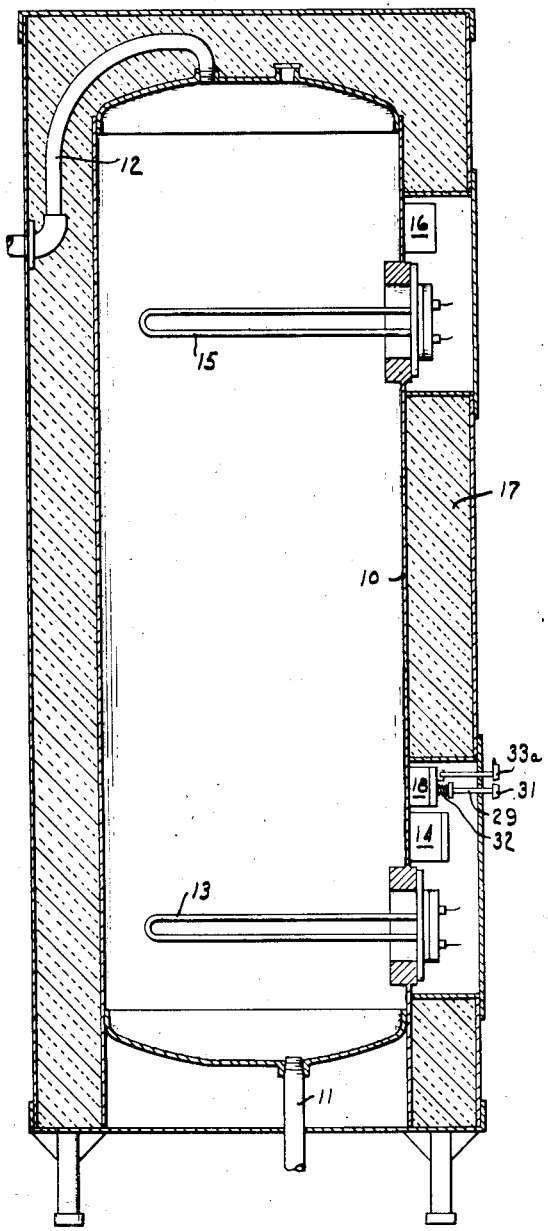
Figure 2:
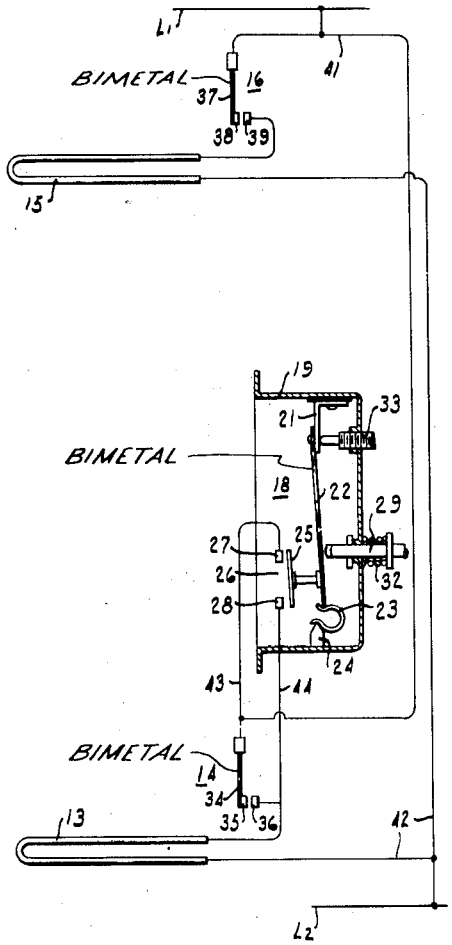

These and other objects are effected by my invention as will be apparent from the following description and claims taken in connection with the accompanying drawing, forming a part of this application, in which:

Fig. 1 is a vertical sectional view of an electrically-heated tank for tap water constructed and arranged in accordance with the present invention; and Fig. 2 is a diagram of the electric connections for the heater disclosed in Fig. 1.

In practicing my invention, I provide a thermostatically-operated switch for energizing and deenergizing the heater of a tap water storage tank in response, respectively to predetermined low and high temperatures of the water. Accordingly, water at a mean temperature sufficient for normal demands is provided.

A second switch is provided and connected in parallel with the thermostatically-operated switch for also controlling energization of the heater. The second switch is manually actuable to its closed position and thermostatically moved to its open position in response to a temperature of the water higher than said predetermined high temperature. If an unusually large demand for hot water is expected for any reason, the second switch is manually closed. Energization of the heater is then effected, regardless of the position of the thermostatically-operated switch, until the water has been heated to a higher temperature whereupon the second switch is automatically opened for deenergizing the heater. Since the second switch is only closed by manual actuation, control of the heater is returned to the primary thermostatically-operated switch for maintaining the water at the normal mean temperature.

Reference will now be had to the drawing wherein I have elected to disclose my invention applied to a domestic hot water heating structure having a conventional cylindrical tank 10 for the storage of hot water. An inlet conduit 11 for cold water communicates with the lowermost region of the tank 10 and hot water is withdrawn from the tank through a conduit 12 communicating with the uppermost region of the tank.

A primary heating element 13 of the immersion type is disposed in the lower region of the tank for heating the water therein and a thermostatically-operated switch, indicated at 14 and disposed in heat exchange relation with the tank 10, controls energization of the primary heating element 13. The switch 14 effects energization of the element 13 in response to a predetermined low temperature of the water adjacent the switch 14 and deenergization of the heater 13 in response to a predetermined high temperature of the water. A secondary heating element 15 may be arranged in an upper region of the tank 10 for heating the water in said upper region. A thermostatically-operated switch structure indicated at 16 and similar in construction to the thermostatically-operated switch 14 may be employed for energizing and deenergizing the element 15 in response to predetermined low and high temperatures of the water in the upper region of the tank 10. The heating elements shown at 13 and 15 may be of any well-understood construction suitable for the heating of water in a tank. Preferably, a body of heat-insulating material indicated at 17 surrounds the tank 10 for retarding the flow of heat therefrom.

During normal operation, the primary heating element 13 is energized when the water in the lower portion of the tank 10 is cooled to a predetermined low temperature, for example, 130° F. because of the entry of cold water through the conduit 11. When this water has been heated to a temperature of, for example, 140° F. the switch structure 14 deenergizes the element 13. The upper element 15 is energized only when a large amount of water is withdrawn from the tank 10 or when the cold water line in the tank rises to adjacent the thermostatically-operated switch 16. The latter switch may also be calibrated to effect energization of the heater 13 at a temperature of 130° F. and to deenergize the heater 15 when the water temperature has been elevated to 140° F.

In accordance with my invention, an additional switch structure generally indicated at 18 is employed for controlling energization of the heater 13. The switch structure 18 is manually closed and thermostatically opened in response to a temperature higher than said predetermined high temperature, for example, 150° F.

Reference will now be had to Fig. 2 wherein I have shown a diagram of the electric connections for the heating elements 13 and 15. The switch structure 18 includes a casing 19 which is secured in heat exchange relation with the tank 10 and which carries a spring bracket 21 having a bimetallic element 22 secured thereto. The movable end of the bimetallic element 22 engages an over-center, U-shaped spring 23 which also engages a knife edge 24 carried by the casing 19. As is well understood, the spring 23 effects a snap action to the bimetal element 22 as the end of the latter passes through a plane intersecting the knife edge 24 and the stationary end of the bimetal 22. The movable end of the bimetal element 22 carries a bridging contact 25 of a switch structure 26, the latter including stationary contacts 27 and 28. The switch 26 is manually closed by means of a push rod 29 which is engageable with the bimetal element 22 for forcing it over center in switch closing direction. The push rod 29 extends to the exterior of the heater structure and is provided with a knob 31 for manual actuation. Preferably, the push rod 29 is maintained out of engagement with the bimetal element 22 by a compression spring indicated at 32. It will be understood that the bimetal element 22 is so constructed and arranged that it is ineffective to close the switch 26 but that it is effective to open the switch 26 at a predetermined high temperature of, for example, 150° F. The temperature at which the bimetal element 22 opens the switch 26 may be adjusted by a screw 33 which positions the spring bracket 21. By running the screw 33 inwardly or to the left as viewed in Fig. 2, the spring bracket 21 and the bimetal 22 are moved in switch closing direction and will increase the temperature at which the bimetal element 22 operates to open the switch. Conversely, by adjusting the screw 33 to move the spring bracket 21 to the right will decrease the temperature at which the bimetal element 22 opens the switch 26. The adjusting screw 33 may be provided with a knob 33a for manual adjustment and which is conveniently located on the exterior of the heater structure.

The thermostat 14 is conveniently shown as including a bimetal member 34 carrying a movable contact 35, the latter being engageable with a stationary contact 36. Similarly, the thermostatically-operated switch 16 includes a bimetal member 37 carrying a movable contact 38 engageable with a stationary contact 39.

The source of power for the heating elements 13 and 15 is represented by line conductors $L_1$ and $L_2$. As shown the line conductor $L_1$ is connected by a branched conductor 41 to both of the movable contacts 35 and 38. The stationary contacts 36 and 39 are connected to one terminal of their respective heaters 13 and 15 and the opposite terminals of these heaters are connected together by a conductor 42 which extends to the line conductor $L_2$. The stationary contacts 27 and 28 of the switch structure 18 are electrically connected by conductors 43 and 44 to the contacts 35 and 36.

Normally, the thermostats 14 and 16 function to maintain the water in the tank at a temperature of 140° F. which is sufficient for the usual rate of consumption of water and which provides for economical operation. If a larger rate of consumption is anticipated by the user for any reason, such as, for example, several operations of a clothes washer, the push button 31 is depressed for transferring control to the switch 18. Accordingly, a single tankful of water at a predetermined higher temperature of 150° F. is provided which when mixed with cold water provides a larger supply of water at the temperature at which the water is utilized. As described, when the switch structure 18 is thermostatically opened, control is returned to the switch structure 14 for operation of the heater at the lower temperature.

While I have shown a two-element heater having the switch structure 18 controlling the lower heater 13, it will be understood that this switch structure 18 may be elevated on the tank and arranged for controlling either the upper heater 15 or the lower heater 13, whereby only a portion of the water located above the switch 18 is heated to the elevated temperature of 150° F. in the example given. As is obvious, the invention may be used equally well with a single-element hot water tank.

From the foregoing description, it will be apparent that I have provided an improved control for a hot water heater which functions during periods of normal consumption to economically heat water at a suitable temperature but which may be readily adjusted to provide a single tankful of higher temperature water when an abnormally high demand for hot water is expected. After the higher temperature charge is provided, control is automatically returned to the primary control means for economical, lower temperature operation.

While I have shown my invention in but one form, it will be obvious to those skilled in the art that it is not so limited, but is susceptible of various changes and modifications without departing from the spirit thereof.

What I claim is:

1. In water heating apparatus, the combination of a tank for storing water, means for admitting cold water to said tank and for withdrawing hot water therefrom, an electric heater for heating the water in the tank, a thermostatically-operated switch for controlling energization of said heater and actuated to open and closed positions in response, respectively, to predetermined high and low temperatures of the water in said tank, a second switch connected in shunt with said thermostatically-operated switch, said second switch having means manually actuated at will for the closing thereof, and thermostatic means responsive to a predetermined temperature of the water, higher than said first-mentioned predetermined high temperature, for opening said second switch.

2. In water heating apparatus, the combination of a tank for storing water, said tank having a first opening through which cold water may be admitted to the tank and a second opening through which hot water may be withdrawn from the tank, an electric heater for heating the water in the tank, a thermostatically-operated switch for controlling energization of said heater and actuated to open and closed positions in response to predetermined high and low temperatures, respectively, of the water in said tank, a second switch connected in shunt with said thermostatically-operated switch, said second switch having means manually actuated at will for the closing thereof, and thermostatic means responsive to a predetermined temperature of the water, higher than said first-mentioned predetermined high temperature, for opening said second switch, said thermostatic means being ineffective to close the second switch.

3. In water heating apparatus, the combination of a tank for storing water, means for admitting cold water to the tank and for discharging hot water therefrom, upper and lower electric heaters for respectively heating upper and lower regions of the tank, a thermostatically-operated switch for controlling energization of the upper heater in response to the temperatures of the water in the upper region of the tank, a second thermostatically-operated switch for controlling energization of the lower heater in response to the temperature of the water in the lower region of the tank, said thermostatically-operated switches effecting energization of their associated heaters in response to predetermined low temperatures and deenergization of their associated heaters in response to predetermined high temperatures, switching means connected in parallel with one of said thermostatically-operated switches, means manually actuated at will for closing said switching means and thermostatic means responsive to a predetermined high temperature of the water in the region of the tank associated with said one thermostatically-operated switch for opening said switching means, said last-mentioned predetermined high temperature being elevated with respect to the high temperature at which said one thermostatically-operated switch operates to deenergize its associated heater.

EDMUND G. PANKOW.

REFERENCES CITED

The following references are of record in the file of this patent:

UNITED STATES PATENTS

| Number | Name | Date |
|---|---|---|
| 1,712,931 | Mulvany | May 14, 1929 |
| 1,968,549 | Allen | July 31, 1934 |
| 1,996,634 | Vaughan | Apr. 2, 1935 |